J. E. MARTIN.
TOOL HOLDER.
APPLICATION FILED JAN. 21, 1915.
1,199,479.
Patented Sept. 26, 1916.
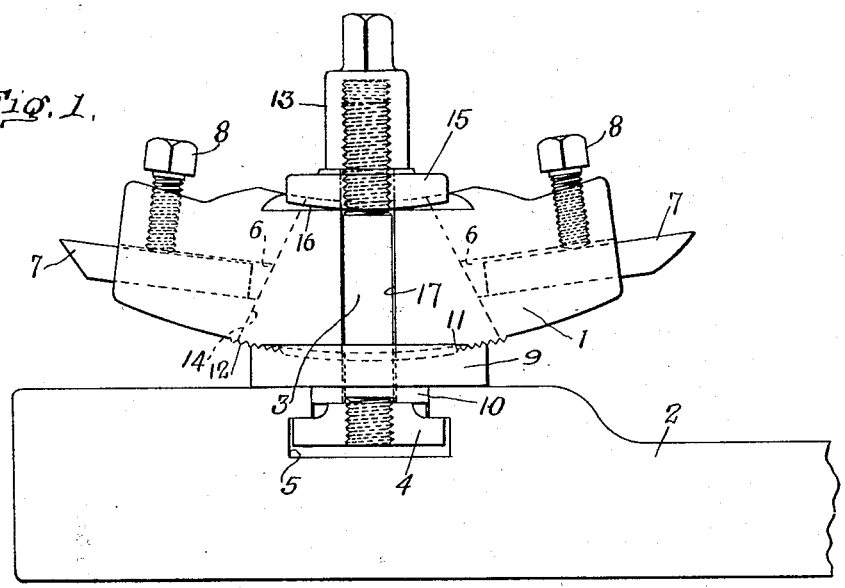
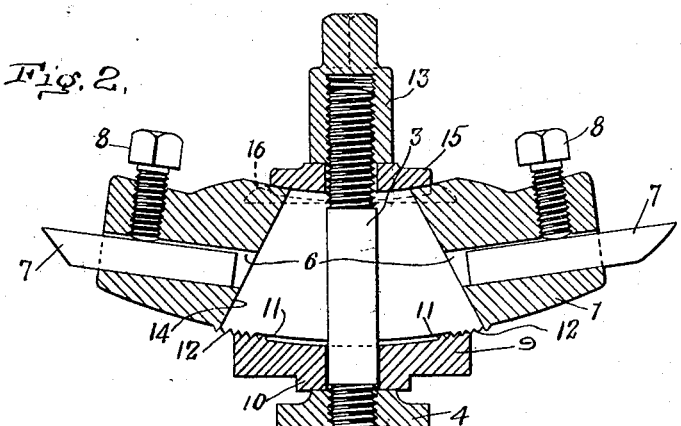
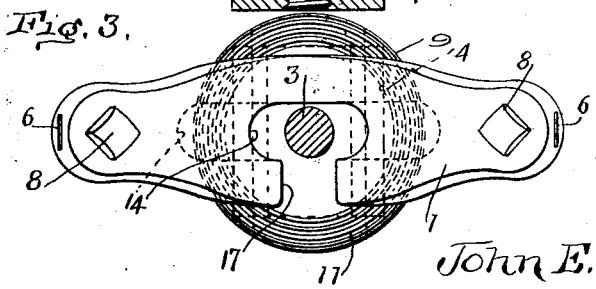
Witnesses
Inventor
John E. Martin,
By
Attorneys

UNITED STATES PATENT OFFICE.

JOHN E. MARTIN, OF SPRINGFIELD, OHIO.

TOOL-HOLDER.

1,199,479.  Specification of Letters Patent.  Patented Sept. 26, 1916.

Application filed January 21, 1915. Serial No. 3,446.

*To all whom it may concern:*

Be it known that I, JOHN E. MARTIN, a citizen of the United States, residing at Springfield, in the county of Clark and State of Ohio, have invented certain new and useful Improvements in Tool-Holders, of which the following is a specification, reference being had therein to the accompanying drawing.

This invention relates to tool holders such as are commonly employed in connection with lathes and the like.

The object of the invention is to provide a holder which will support a plurality of tools in such a manner that they can be successively brought into engagement with the work, and in such a manner that they can be brought into engagement with the work in the same manner as the tool carried by a single tool holder. Multiple tool holders as commonly employed comprise an arm which is adjustably mounted on a supporting frame and at the end of which is a rotatable head, usually mounted on a horizontal axis, and carrying a series of tools, the head being rotated about its axis to bring the desired tool into engagement with the work. The construction of the head is such, however, that it is difficult and often impossible to present the tool to the work in the manner desired because the head itself prevents the holder being placed in the proper position relative to the work and, as stated, one object of my invention is to overcome this difficulty and provide a multiple tool holder which can be manipulated with the same freedom as the holder for a single tool.

A further object of the invention is to provide means for quickly and easily adjusting the holder to position the tool relatively to the work, and for securing the holder in its adjusted position; and, it is also an object of the invention to provide a tool holder of such a construction that it can be quickly and easily removed from the supporting frame, when it is desired to substitute another holder therefor.

In the accompanying drawings Figure 1 is a side elevation of a tool holder embodying my invention; Fig. 2 is a longitudinal sectional view taken centrally through such a tool holder; and Fig. 3 is a top plan view of the same.

In these drawings I have illustrated one embodiment of my invention and have shown the same as comprising a body portion or holder proper 1 which is mounted on the tool supporting frame 2, this frame being of the usual construction, and being adjustable to move the holder bodily relatively to the work. The tool holder is secured to the supporting frame by means of a central vertical bolt 3 having at its lower end a T-shaped head 4, which may be rigidly or otherwise secured thereto, and which is mounted in a T-shaped slot 5 in the supporting frame, thereby permitting the holder to be adjusted bodily along the slot and also permitting the holder to be moved about a vertical axis. The present holder is designed to accommodate two tools only and is provided with two arms, each corresponding in its general shape with the shape of the ordinary single tool holder, in that it has the reduced outer end which carries the tool and is of such a construction that it can be brought very close to the work and that the work may be arranged on either side of the same without interference. These two arms are preferably formed integral and constitute the body 1 of the holder. Each arm is provided with the usual longitudinal opening 6 to receive a tool 7, which tool is clamped in the arm by means of a set screw 8. The body 1 of the holder is so constructed and is connected to the supporting frame in such a manner that it can be moved to vertically adjust the tool relatively to the work. To this end it has its lower surface curved and supported by a curved washer or supporting plate 9 which is mounted directly upon the frame 2 and has a squared portion or boss 10 entering the upper portion of the T-shaped groove 5 to hold the washer against displacement. The washer is preferably circular and has its upper surface concave or dish-shaped to receive the curved lower portion of the body of the holder.

The opening in the holder, through which the bolt 3 extends, which is shown at 14, is in the form of a longitudinal slot extending vertically through the holder and is of a greater length at its bottom than at its top, so as to give it a fan shape and permit of the body being moved longitudinally thereof, thereby causing the curved lower surface thereof to travel on the concave washer and to raise and lower the opposite ends thereof. Preferably, the outer portion of the washer 9 is provided with a series of teeth or serrations which, in the present instance, are in the form of a plurality of annular ribs 11 and the lower portion of the body 1 is also provided with similar serrations or ribs 12 adapted to coöperate with the serrations on the washer to prevent slipping of the body of the tool holder. The serrations both on the body of the holder and on the washer are spaced away from the center thereof to prevent the serrations on one side of the holder engaging those on the opposite side of the washer when the holder is moved to one extreme position. The body is clamped onto the washer by means of a nut 13 screw threaded onto the upper portion thereof. A locking plate 15 is interposed between the nut 13 and the body of the tool holder, is elongated in shape, and has at its opposite lateral edges depending flanges which extend along the opposite sides of the body and hold the locking plate against rotation. This plate has its lower surface, between the flanges 16, convexed or curved about a transverse axis, and the upper surface of the body of the holder is similarly curved to receive this locking plate, thereby enabling the same to remain in engagement with the body throughout its length when the latter is moved into different positions. By slightly loosening the nut 13, as will be apparent, the body portion can be either moved about its vertical axis or moved longitudinally on the base plate or washer 9, and then clamped in its adjusted position.

The up and down adjustment might be called an arc sliding joint. It will be noticed that the curves of both the lower and upper portions of the body 1 and their adjacent coöperating curved portions are substantially concentric. The radii of curvature have a common center located some distance above the body of the tool. The curvatures, therefore, are very slight comparatively. By the above arrangement when the body 1 is moved longitudinally the longitudinal movement will be as great or exceed the vertical movement. By the arrangement above described should the cutting tool be set above the center of the work and not very securely locked it will have a tendency to push straight back from the work when pressure is applied on the point of the cutting tool. Otherwise, the cutting tool would swing down, thus forcing the point of the tool into the work and in many cases spoiling the job.

It not infrequently happens that, where a double tool holder is used, the work will require the use of more than two tools, or different kinds of work will be handled in succession, and it is not desired to remove the tool from the holder after it has once been set. Under these circumstances, a second tool holder is employed and is substituted for the first tool holder when it is desired to use the second set of tools. To enable this change to be quickly and easily made, I have provided the body portion of the holder with a vertical slot 17 in one side thereof communicating with the opening 14 through which the bolt 3 passes. Thus, by loosening the bolt 3 merely enough to enable the flanged locking plate to be disengaged from the upper part of the holder, the holder can be moved laterally from the bolt and another similar holder placed on the bolt in clamping position in a very short space of time.

While I have shown and described one embodiment of my invention, it will be understood that this has been chosen for the purpose of illustration only, and that I do not wish to be limited to the details of construction shown and described, except as required by the scope of the appended claims, for obvious modifications will occur to a person skilled in the art. For example, it is not essential that the tools should be arranged in exact relation to the body of the holder that is shown in the drawings. They may be offset or otherwise arranged as the needs of the work may suggest.

Having thus fully described my invention, what I claim as new and desire to secure by Letters Patent, is:

1. In a device of the character described, a tool holder comprising upper and lower curved edges concentrically arranged and having radii of curvature of comparative great length, and curved clamping members between which said tool holder is adjustable longitudinally whereby a vertical adjustment is secured, the curved portions of said clamping members being such as to properly engage the curved edges of the tool holder, the entire arrangement being such that the tool holder has a tendency to push straight back instead of vertically if not properly locked.

2. The combination, with a vertically extending bolt, of a tool holder comprising an elongated narrow body portion, concentric upper and lower curved edges, means for holding tools at each end and an elongated opening between the ends thereof through which said bolt passes, a curved supporting plate upon which the curved lower edge of said holder rests, and an elongated curved locking plate in engagement with the curved upper edge of said holder, said holder and locking plate having means to prevent the relative movement of the same around the bolt as an axis, and means to clamp the parts together in adjusted position.

3. In a device of the character described, a supporting frame having a slot, a bolt having a head mounted in said slot, a supporting plate mounted about said bolt and having a square boss extending into said slot, the upper surface of said supporting plate being curved, a tool holder having a lower curved portion seated upon said curved surface of said supporting plate and rotatable relatively thereto around the bolt as an axis, said tool holder having a vertically extending slot through which said bolt passes, and means to adjustably clamp said tool holder in various positions longitudinally upon said plate, whereby the tool holder is adjusted vertically.

4. The combination with a supporting frame and a bolt mounted thereon, of a tool holder comprising a body portion having means to secure a tool thereto, and having an elongated vertical opening arranged between the ends thereof through which the bolt of said supporting frame extends, said body portion having a curved lower portion, a curved plate upon which the body portion rests, said supporting plate and said body portion having their adjacent faces provided with serrations arranged at points remote from the centers thereof, and a nut mounted on said bolt to clamp said body in engagement with said plate.

5. The combination with a supporting frame and a bolt mounted thereon, of a tool holder comprising an elongated body portion having tool holding devices at each end thereof and having an elongated opening between the ends thereof through which said bolt extends, said body portion having its lower portion curved and a curved supporting plate to receive the curved lower portion of said body, an elongated flanged locking plate mounted upon the upper portion of said body the flanges embracing said body, said body and said locking plate having their adjacent faces curved, and a nut mounted on said bolt and adapted to engage said locking plate to clamp said body in engagement with said supporting plate.

6. In a device of the character described, a supporting frame having a slot, a bolt having a head mounted in said slot, a supporting plate mounted about said bolt, having a boss extending into said slot and having its upper surface concave, a tool holder comprising an elongated body portion having a curved lower portion seated in said concave supporting plate, having an elongated vertical opening between the ends thereof to receive said bolt, having a vertical slot in the side wall thereof communicating with said opening and through which said bolt may be moved, and having means at each end thereof to support a tool, a locking plate mounted about said bolt and engaging the upper edge of said body portion, and a nut mounted on said bolt.

7. The combination with a supporting frame and a bolt mounted thereon, of a tool holder comprising an elongated body portion having a vertical opening between the ends thereof to receive said bolt and having means at each end thereof to support a tool, said body portion having a vertical slot in the side wall thereof communicating with said vertical opening therein to permit said body portion to be removed laterally from said bolt, and a nut on said bolt to clamp said body portion in position.

In testimony whereof, I affix my signature in presence of two witnesses.

JOHN E. MARTIN.

Witnesses:
WILLIAM E. MARTIN,
CHAS. A. S. FORD.

Copies of this patent may be obtained for five cents each, by addressing the "Commissioner of Patents. Washington, D. C."